(12) United States Patent
Chand et al.

(10) Patent No.: US 11,057,340 B2
(45) Date of Patent: *Jul. 6, 2021

(54) PER-APPLICATION SPLIT-TUNNELED UDP PROXY

(71) Applicant: VMWARE, INC., Palo Alto, CA (US)

(72) Inventors: Puran Chand, Bangalore (IN); Craig Farley Newell, Atlanta, GA (US); Amit Kumar Yadav, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/574,116

(22) Filed: Sep. 18, 2019

(65) Prior Publication Data

US 2021/0021564 A1 Jan. 21, 2021

(30) Foreign Application Priority Data

Jul. 19, 2019 (IN) .............................. 201941029115

(51) Int. Cl.
*G06F 15/16* (2006.01)
*H04L 29/12* (2006.01)
*H04L 29/06* (2006.01)

(52) U.S. Cl.
CPC ...... *H04L 61/1511* (2013.01); *H04L 61/2592* (2013.01); *H04L 63/166* (2013.01); *H04L 69/164* (2013.01)

(58) Field of Classification Search
CPC ............... H04L 61/1511; H04L 69/164; H04L 61/2592; H04L 63/166
See application file for complete search history.

(56) References Cited

U.S. PATENT DOCUMENTS

| 8,819,280 | B1 * | 8/2014 | Liu ........................ H04L 63/102 709/244 |
|---|---|---|---|
| 10,009,271 | B2 | 6/2018 | Takenaka et al. |
| 10,320,739 | B2 | 6/2019 | Stahura et al. |
| 2007/0061887 | A1 | 3/2007 | Hoover et al. |
| 2011/0078292 | A1 | 3/2011 | Ananda et al. |
| 2012/0084184 | A1 | 4/2012 | Raleigh et al. |
| 2013/0111066 | A1 | 5/2013 | Vempati et al. |
| 2013/0179551 | A1 | 7/2013 | Li |
| 2013/0332986 | A1 | 12/2013 | Sima et al. |

(Continued)

OTHER PUBLICATIONS

Unknown, "Understanding Split Tunneling," May 2015, arubanetworks.com, web.archive.org/web/20150526023513/ https://www.arubanetworks.com/techdocs/ Aruba OS_ 63_ Web Help/Content/Aruba FrameStyles/Remote_AP/Split_Tunneling. htm (Year: 2015).

*Primary Examiner* — Padma Mundur
(74) *Attorney, Agent, or Firm* — Thomas Horstemeyer, LLP

(57) ABSTRACT

Disclosed are various embodiments for providing split-tunneled network connectivity on a per-application basis. A request to make a universal datagram protocol (UDP) connection to a remote host specified by an internet protocol (IP) address in the request is received from a network driver. A hostname lookup table is queried to determine a hostname associated with the IP address for the remote host. A policy is identified based on the hostname associated with the IP address for the remote host. Then, the UDP connection is routed based on the policy.

19 Claims, 9 Drawing Sheets

(56) References Cited

U.S. PATENT DOCUMENTS

| | | | |
|---|---|---|---|
| 2014/0282821 A1* | 9/2014 | Adler | H04L 63/20 |
| | | | 726/1 |
| 2014/0366081 A1 | 12/2014 | Wood | |
| 2018/0007054 A1 | 1/2018 | Els et al. | |
| 2018/0234385 A1 | 8/2018 | O'Neil | |
| 2018/0255060 A1* | 9/2018 | Bansal | H04L 67/02 |
| 2018/0309658 A1* | 10/2018 | Parla | H04L 45/745 |
| 2018/0316612 A1* | 11/2018 | Akers | H04L 45/745 |
| 2019/0199822 A1* | 6/2019 | Desbureaux | H04L 63/00 |
| 2020/0084177 A1 | 3/2020 | Wu et al. | |

\* cited by examiner

PER-APPLICATION SPLIT-TUNNELED UDP PROXY

RELATED APPLICATIONS

Benefit is claimed under 35 U.S.C. 119(a)-(d) to Foreign Application Serial No. 201941029115 filed in India entitled "PER-APPLICATION SPLIT-TUNNELED UDP PROXY", on Jul. 19, 2019, by VMWARE, Inc., which is herein incorporated in its entirety by reference for all purposes.

The present application is related in subject matter to U.S. patent application Ser. No. 16/574,088, U.S. patent application Ser. No. 16/574,128, which is incorporated herein by reference.

BACKGROUND

Network tunnels are often used to provide a logical connection between two physically separate networks or systems to form a single logical network. For example, a virtual private network (VPN) may be used to establish a private network across an untrusted, public network using a network tunnel between endpoints. Moreover, a client connected to the VPN can be configured to route all network traffic through the VPN tunnel, including traffic destined for the public Internet, or can be configured in a split-tunnel manner where local network traffic is routed over the VPN while other network traffic is routed across the public Internet.

Some systems, such as computers with the MICROSOFT WINDOWS® operating system installed, do not provided fine-grained VPN support. For example, MICROSOFT WINDOWS does not natively provide an application identifier for individual applications requesting a network connection. As a result, VPN access normally cannot be provided on a per-application basis. Therefore, all applications have their traffic routed through a VPN connection using the same VPN configuration. As another example, the domain name system (DNS) resolver provided by WINDOWS is globally available to all installed applications. As a result, all applications installed on a WINDOWS client will use the same DNS resolver to resolve DNS queries.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for providing split-tunneled network connectivity on a per-application basis in a transparent manner. Network connectivity is often termed as split-tunneled if network traffic can be directed to take different routes based on one or more criteria (e.g., network destination or traffic type). For instance, VPN clients often offer split-tunnel connectivity. As an example, network traffic with a destination to the LAN may be routed through a VPN, while network traffic with a destination to the WAN may be routed through another network interface.

Unfortunately, many operating systems do not permit split-tunneled network connectivity on a per-application basis. VPN settings are often per device—all applications are subject to the same VPN settings. If the VPN connection does not permit a split-tunnel, then no applications are able to bypass the VPN. If the VPN connection is a split-tunnel, the same routing rules are applied to all applications installed and executing on the client device. And even if the operating system allows for the VPN to configured on a per-application basis (e.g., VPN access is granted on a per-application basis), the same VPN routing rules are often still applied to those applications that are granted VPN access.

This can be a problem in some instances because different applications may have different requirements for VPN access. For example, a web-browser may need a split-tunnel VPN so that certain types of traffic are routed through the VPN while other types of traffic are routed directly across the network, bypassing the VPN. These traffic rules could be based on traffic type or destination. Meanwhile, an email client may need all traffic routed across the VPN in order to establish a secure connection with a company's internal email servers.

To address these issues, various approaches to providing a split-tunneled network connection on a per-application basis are provided. The split-tunneled network connection is further performed in a transparent manner, such that applications are unaware that their network traffic is being routed or proxied. Each application installed on a computing device can have traffic routed in a split-tunnel fashion using application specific rules. For example, a web browser could have multiple rules specified for routing traffic across a network tunnel or bypassing the network tunnel based on criteria such as the destination hostname or destination internet protocol (IP) address, while an email client could have a rule specifying that all traffic be routed across the network tunnel. In the following discussion, a general description of the system and its components is provided, followed by a discussion of the operation of the same.

Figure 1:
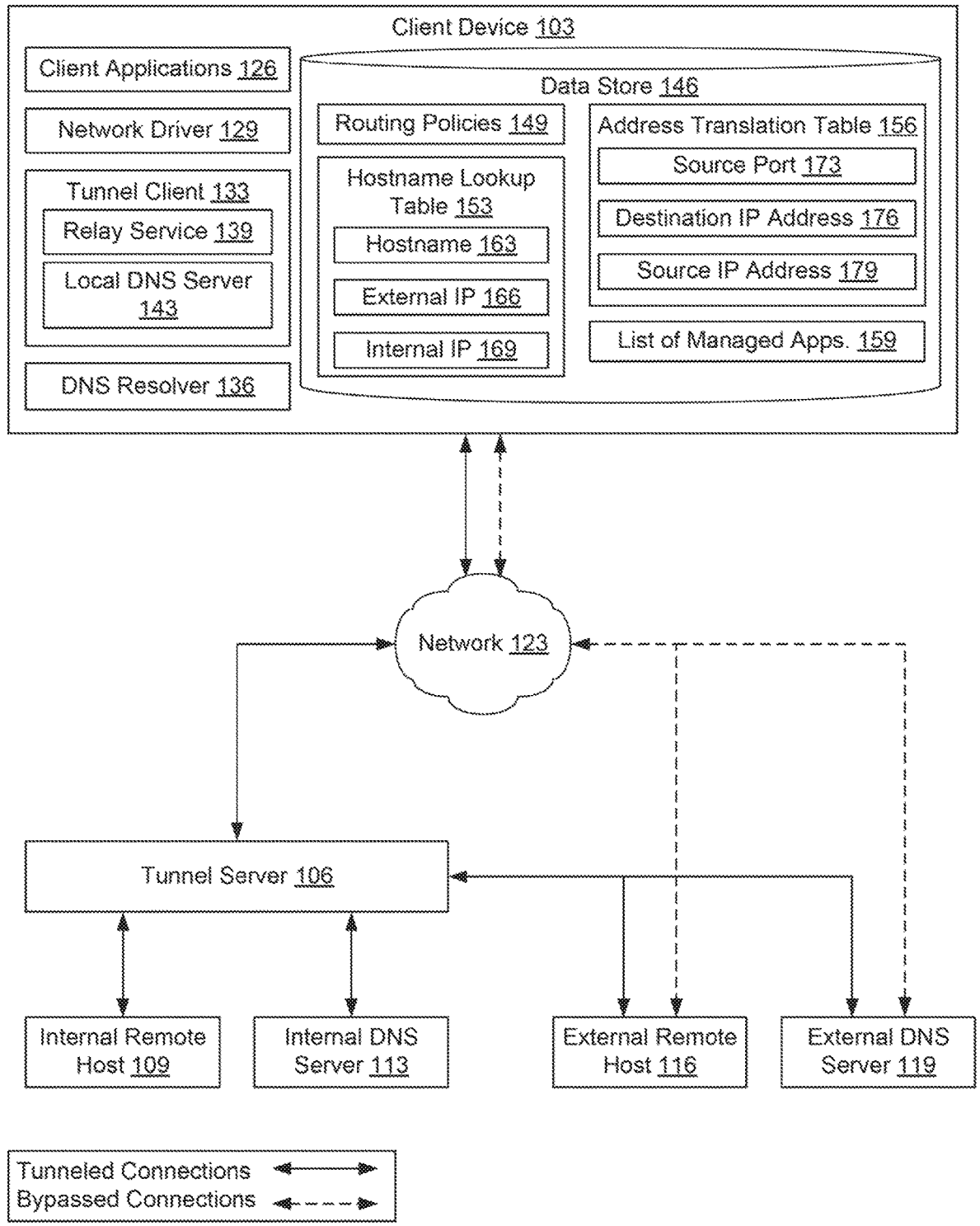
FIG. 1 is a drawing of a network environment according to various embodiments of the present disclosure.

With reference to FIG. 1, shown is a network environment 100 according to various embodiments. The network environment 100 includes a client device 103, a tunnel server 106, an internal remote host 109, an internal domain name service (DNS) server 113, an external remote host 116, and an external DNS server 119, which are in data communication with each other via a network 123. The network 123 can include the Internet, intranets, extranets, wide area networks (WANs), local area networks (LANs), wired networks, wireless networks, or other suitable networks, etc., or any combination of two or more such networks 123. For example, such networks 123 can comprise satellite networks, cable networks, Ethernet networks, and other types of networks.

The client device 103 is representative of any one or more client devices 103 that can be coupled to the network 123, such as a desktop computer, a laptop computer, personal digital assistants, cellular telephones, smartphones, set-top boxes, music players, web pads, tablet computer systems, game consoles, electronic book readers, or other devices with like capability. The client device 103 can include a display, such as liquid crystal display (LCD) displays, gas plasma-based flat panel displays, organic light emitting diode (OLED) displays, electrophoretic ink (E-ink) displays, LCD projectors, or other types of display devices, etc. The client device 103 can be configured to execute various applications such as a one or more client applications 126, a network driver 129, a tunnel client 133, and a DNS resolver 136.

The client application 126 can access network content or resources made available by the internal remote host 109 or the external remote host 116. Illustrative examples of a client application 126 include a web browser, email client, instant messenger, or a network file storage client.

The network driver 129 can capture network traffic from client applications 126 and route that traffic to the tunnel client 133. For example, the network driver 129 can modify the destination address to the localhost address and the destination port to a port that the relay service 139 of the tunnel client 133 is bound. The network driver 129 can be configure to intercept or capture the network traffic of all client applications 126 installed on the client device 103 or just from those client applications 126 that have been previously selected or specified to have their network traffic capture and routed by the network driver 129.

In some implementations, the network driver 129 can be installed and operate separately from the networking drivers provided by the operating system of the client device 103. In these instances, the network driver 129 would only accept connections from client applications 126 explicitly configured to use the network driver 129 for network connectivity. Other client applications 126 would be unaware of the existence of the network driver 129 and use the generic networking functionality provided by the operating system of the client device 103.

The tunnel client 133 can establish a network tunnel with the tunnel server 106. A network tunnel is a point-to-point network connection between two endpoints (e.g., the tunnel client 133 and the tunnel server 106) that allows for network traffic to be encapsulated and sent or routed between the two endpoints. A network tunnel can be established using a variety of approaches, such as virtual private networks (VPNs) or proxy services. A network tunnel may or may not be encrypted, depending on whether encryption is supported by the tunnel protocol or service used. Examples of VPNs include internet protocol security (IPSEC) VPNs, secure sockets layer (SSL) VPNs, and secure shell (SSH) VPNs. Examples of proxy services or connections include SOCKS proxies and application proxies (e.g., HTTP or HTTPS proxies, FTP proxies, SMTP proxies, etc.).

The relay service 139 is executed to accept connections at the transport layer of the OSI model (e.g., TCP, UDP, SCTP, or DCCP connections) and relay those connection across a network tunnel or tunneled connection. For example, the relay service 139 can have an open socket listening on a predefined or prespecified port to accept transmission control protocol (TCP), universal datagram protocol (UDP), stream control transmission protocol (SCTP), or datagram congestion control protocol (DCCP) connections. When a connection is made to the relay service 139, it can route or send the connection across the network tunnel to the tunnel server 106, from which the connection continues to its destination.

The local DNS server 143 is an application that provides response to queries for an IP address. Generally, the queries can contain a hostname, uniform resource locator (URL), or other human readable network address. The local DNS server 143 can then search for an IP address that has been previously associated with the hostname in the DNS query. If the IP address has not been previously cached (e.g., in response to a prior query for the same hostname), the local DNS server 143 can recursively search for IP address. For example, the local DNS server 143 can query either the internal DNS server 113, the external DNS server 119, or both, in order to determine the IP address for a hostname.

The DNS resolver 136 can send a DNS query to a DNS server to determine the IP address associated with a hostname included in the DNS query. The DNS resolver 136 can send DNS queries on behalf of client applications 126 executed by the client device 103. The DNS resolver 136 can be configured to use a specific DNS server, such as the local DNS server 143 provided by the tunnel client 133, or another DNS server, such as the internal DNS server 113 or the external DNS server 119. For example, the DNS resolver 136 could be configured to use the local DNS server 143 in response to the tunnel client 133 beginning execution and establishing a tunneled connection with the tunnel server 106. Once the DNS resolver 136 receives the requested IP address, it can cache or otherwise store the response and provide the requested IP address to the requested client application 126.

Also, various data is stored in a data store 146 stored on the client device 103. Examples of data stores 146 include relational databases, non-relational databases, object-oriented databases, hierarchical databases or data structures, key-value stores, as well as any area in the memory of the client device allocated to store information related to the implementation of one or more components executed by the client device 103. The data stored in the data store 146 is associated with the operation of the various applications executed by the client device 103, including the client applications 126, network driver 129, tunnel client 133, and DNS resolver 136. The data stored in the data store 146 includes routing policies 149, a hostname lookup table 153, an address translation table 156, a list of managed applications 159, and potentially other data.

Routing policies 149 are used to decide how to route traffic originating from a client application 126 based on various criteria. Examples of the criteria used to determine how to route the traffic include the type of client application 126 (e.g., web browser, email client, VoIP application, instant messenger, etc.), the identity of the client application 126 (e.g., CHROME®, FIREFOX®, INTERNET EXPLORER®, etc.), the type of network traffic (e.g., TCP or UDP, HTTP, FTP, SSMTP, POP3, IMAP, SSL/TLS encrypted, etc.), or the destination of the network traffic (e.g., the IP address or destination hostname). A routing policy 149 can also specify the type of action to be taken based on the matching criteria. Examples of the actions that may be taken can include blocking the network traffic, routing the network traffic through a network tunnel between the tunnel client 133 and the tunnel server 106, or allowing the client application 126 to directly send network traffic to the destination through a bypassed connection.

Multiple routing policies 149 may also apply to the same client application 126. As an illustrative example, a web browser could be subject to multiple routing policies 149. Some routing policies 149 could direct network traffic to particular hostnames or domains through a tunneled connection, while other routing policies 149 could block network traffic to other hostnames or domains. Meanwhile, a default routing policy 149 for the web browser could specify that all other network traffic be routed through a bypassed connection.

The hostname lookup table 153 can be used to maintain a mapping of hostnames 163 with respective external IP addresses 166 and internal IP addresses 169. In some instances, however, the hostname lookup table 153 may only maintain a mapping of external IP addresses 166 and internal IP addresses 169. An entry in a hostname lookup table 153 could be formatted accordingly:

| Hostname | External IP | Internal IP |
| --- | --- | --- |
| ExampleMachine1 | 1.1.1.1 | 192.168.1.1 |
| ExampleMachine2 | 1.1.1.1 | 192.168.1.2 |

Of note is that it is possible for multiple machine names to be assigned different internal IP addresses 169, but share the same external IP address 166. As the world approaches IPv4 address exhaustion, it is common for multiple services or machines to share the same publicly accessible external IP address 166. For example, the web server www.example.com and the email server mail.example.com could resolve to the same external IP address 166, even if they are hosted on different machines. Similarly, the hostnames www.exampleA.com and www.exampleB.com could resolve to the same external IP address 166. Generally, when multiple hostnames resolve to the same external IP address, the connections are appropriately routed and processed using various virtual hosting or reverse proxy solutions.

For reference, a hostname 163 is a humanly meaningful, and often text-based, identifier of a computing device. Examples of hostnames 163 include fully qualified domain names (FQDNs), machine names, or similar identifiers.

An external IP address 166 is a publicly reachable or routable IP address. Accordingly, the external IP address 166 for a hostname 163 can represent an IP address for an external remote host 116 that be reached through either a tunneled connection or a bypassed connection.

An internal IP address 166 for hostname 163 can represent an IP address for an internal remote host 109 that is only reachable through a tunneled connection or an IP address for an external remote host 109 when the connection to the external remote host 116 is made through a tunneled connection instead of a bypassed connection. Examples of internal IP addresses 166 include private IPv4 address ranges specified by RFC 1918 (e.g., 10.0.0.0/8, 172.16.0.0/12, or 192.168.0.0/16) or IPv6 address ranges specified by RFC 4193 (e.g., fd00::/8). However, IP addresses outside of these address ranges that are not publicly routable or accessible could also be used as internal IP addresses 166.

The address translation table 156 can be used to store a mapping of IP addresses for correctly relaying datagram or other stateless or connectionless network traffic, such as UDP network traffic. Because stateless connections, such as UDP, do not track whether a datagram that is received is related to a previous datagram, client applications 126 often implement their own state tracking mechanisms. For example, if a client application 126 receives a UDP datagram, the client application 126 can evaluate the UDP datagram to determine whether the UDP datagram is a response to a previously sent UDP datagram or is an unsolicited UDP datagram. Accordingly, changes to a UDP datagram that are made to tunnel or otherwise route a UDP datagram through a tunneled connection can break the evaluation performed by the client application 126 to determine whether a UDP datagram it receives is a response to a previously sent UDP datagram or is an unsolicited UDP datagram. Accordingly, for each UDP datagram that is sent by a client application 126, the source port 173 for the UDP datagram is recorded as well as the respective destination IP address 176 for the UDP datagram. If the UDP datagram is routed through a tunneled connection to the tunnel server 106, the source IP address 179 used for the UDP datagram can also be recorded. Although described in further detail later, when a response UDP datagram is received from the source IP address 179, the response UDP datagram can be modified to reflect as its source IP address the destination IP address 176 of the original UDP datagram. As a result, the client application 126 is able to continue to determine whether a UDP datagram it receives is a response to a previously sent UDP datagram or is an unsolicited UDP datagram while the tunnel client 133 is able to intercept and reroute UDP traffic transparently on behalf of the client application 126.

The list of managed applications 159 is a list of client applications 126 for which the network driver 129 is to intercept or capture network traffic for routing in compliance with the routing policies 149. Client applications 126 may be identified by name, by a unique identifier application identifier, or other mechanism.

Next, a general description of the operation of the various components of the network environment 100 is provided. The following description is only intended to introduce the interactions between the various components of the network environment 100. More detailed descriptions of the various components are provided when discussing the subsequent figures, including alternative implementations of various features, where appropriate.

To begin, a client application 126 makes an attempt to access network content, such as when a web browser attempts to access a web page, a VoIP client attempts to connect to a VoIP service, or an email client attempts to access an email server. The access generally involves the client application 126 making two requests. First, the client application 126 makes a DNS request for an IP address that maps to the hostname 163 (e.g., fully qualified domain name) where the network content is located. Upon receiving the IP address, the client application 126 then makes a connection attempt to access the network content using the IP address.

To process the DNS request, the client application 126 sends the DNS request to the DNS resolver 136 provided by the operating system of the client device 103. The DNS resolver 136 then sends the DNS query to the local DNS server 143, which has been previously configured as the default or primary DNS server for use by the DNS resolver 136. If the local DNS server 143 has previously cached a response for the hostname 163, then the local DNS server 143 can provide the internal IP address 169 or external IP address 166 for the hostname 163 from the hostname lookup table 153, if available. Whether the local DNS server 143 provides the internal IP address 169 or external IP address 166 can depend on what is specified by a routing policy 149.

If no record for the hostname 163 is provided in the hostname lookup table 153, then the local DNS server 143 can make recursive queries in parallel to the internal DNS server 113 and the external DNS server 119. The internal IP address 169 provided by the internal DNS server 113 and the external IP address 166 provided by the external DNS server 119 can then be stored together with the hostname 163 in the hostname lookup table 153. Again, whether the local DNS server 143 provides the internal IP address 169 or external IP address 166 can depend on what is specified by a routing policy 149.

In some implementations, the local DNS server 143 can provide a resolved IP address according to a predefined priority order. For example, the local DNS server 143 can be configured to always provide the internal IP address 169 for a hostname 163, if available. If an internal IP address 169 is unavailable, then the external IP address 166 for the hostname 163 can be provided. Additional routing decisions can be made by the network driver 129 or the tunnel client 133 in compliance with one or more routing policies 149, as discussed later.

In other implementations, the local DNS server 143 can provide a resolved IP address in compliance with a routing policy 149. In this implementation, the local DNS server 143 can search for a routing policy 149 that matches the hostname 163 to be resolved. If the routing policy 149 specifies that the network traffic is to be routed through a tunneled connection by the tunnel client 133, then the internal IP address 169 can be provided by the local DNS server 143 to the DNS resolver 136. Likewise, if the routing policy 149 specifies that the network traffic is not to be routed through the tunneled connection, but instead through a bypassed connection across the network 123, then the external IP address 169 can be provided by the local DNS server 143 to the DNS resolve 136. However, if the routing policy 149 specifies that the network traffic for the client application 126 should be blocked (e.g., because the hostname 163 is for a website that is prohibited by policy or the external IP address falls within a range of prohibited or "blacklisted" IP addresses), the local DNS serve 143 could respond with a non-routable IP address or simply fail to respond.

In any of these scenarios, once the DNS resolver 136 receives an IP address from the local DNS server 143, the DNS resolver 136 provides the resolved IP address for the hostname 163 to the requesting client application 126. Upon receiving the IP address (e.g., internal IP address 169 or external IP address 166), the client application 129 attempts to make a connection to the remote host. To do so, the client application 126 can provide the network driver with the resolved IP address (e.g., internal IP address 169 or external IP address 166) to the network driver 129. The network driver 129 can then follow one of several potential implementations in order to decide whether and how to establish a network connection on behalf of the client application 126. In the first implementation, the routing decision can be performed by the tunnel client 133, while in the second implementation, the routing decision can be performed by the network driver 129.

In the first implementation, the network driver 129 can make a connection request with the tunnel client 133 on behalf of the client application 126. The tunnel client 133 can then make a routing determination for the connection and provide a response to the network driver 129. The response can include an instruction, signal, or message for the network driver 129 regarding how to handle the connection request from the client application 126. For example, the connection response can instruct the network driver 129 to redirect the network connection to the relay service 139 provided by the tunnel client 133, which can route the connection to the tunnel server 106 over a tunneled connection. As another example, the connection response can instruct the network driver 129 to bypass the relay service 139 and route the connection directly to a remote host (e.g., an external remote host 116) over a bypassed connection. As a third example, the connection response can instruct the network driver 129 to close the connection, thereby blocking access to the remote host by the client application 126.

To make the routing determination for the connection, the tunnel client 133 can evaluate one or more routing policies 149. As a simple example, if the connection request from the network driver 129 on behalf of the client application 126 includes an internal IP address 169, the routing policy 149 can specify that the connection be redirected to the relay service 139 for routing over a tunneled connection. However, there are more complicated examples of routing polices 149.

For instance, many services are hosted using the same external IP address 166. Accordingly, multiple different websites reachable through different hostnames 163 can be hosted using the same external IP address 166 (e.g., through the use of virtual hosting or a reverse proxy). To provide routing policies 149 on a per-hostname 163 basis, the internal DNS server 113 can provide a separate internal IP address 169 for each hostname 163 that is reachable at the same external remote host 116 using the same external IP address 166. When the tunnel client 133 receives an internal IP address 169, it can search for a routing policy 149 applicable to the internal IP address 169. The applicable routing policy 149 could specify that the connection should be blocked (e.g., when access to certain hostnames 163 is to be blocked). In this case, the tunnel client 133 could respond to the network driver 129 with a command to close the connection. As another example, the applicable routing policy 149 could specify that the connection is permitted using a tunneled connection provided by the tunnel client 133 and tunnel server 106. In this example, the tunnel client 133 could respond to the network driver 129 with a command to redirect the connection to the relay service 139. As a third example, the applicable routing policy 149 could specify that the connection is permitted, but should be made using a bypassed connection directly with the external remote host 116 using the external IP address 166 for the external remote host 116. Accordingly, the tunnel client 133 could retrieve the external IP address 166 from the hostname lookup table 153 and provide it to the network driver 129 with a command to connect directly to the external remote host 116 using the provided external IP address 166.

However, the tunnel client 133 may not evaluate a routing policy 149 in every instance. For example, the connection request could include an external IP address 166. As discussed previously, the external IP address 166 could map to any number of hostnames 163 or internal IP addresses 169. Therefore, the tunnel client 133 may opt not to search for or evaluate a routing policy 149, but instead send a response to the network driver 129 to establish a connection to the external remote host 116 directly (e.g., over a bypassed connection).

In the second, alternative implementation, the network driver 129 can evaluate the request from the client application 126 to initiate the network connection instead of the tunnel client 133. Accordingly, the network driver 129 could use the IP address provided in the network connection request from the client application 126 to search for an applicable routing policy 149. If the routing policy 149 specified that the network connection were to be blocked, the network driver 129 could close the connection. If the routing policy 149 specified that the connection were to be routed through a tunneled connection to its final destination (e.g., the internal remote host 109 or the external remote host 116), then the network driver 129 could establish a connection with the relay service 139 provided by the tunnel client 133 to establish the tunneled connection. Likewise, if the routing policy 149 specified that the network connection were to use a bypassed connection to connect to an external remote host 116 directly, the network driver could establish the bypassed connection with the external remote host 116.

Figure 2:
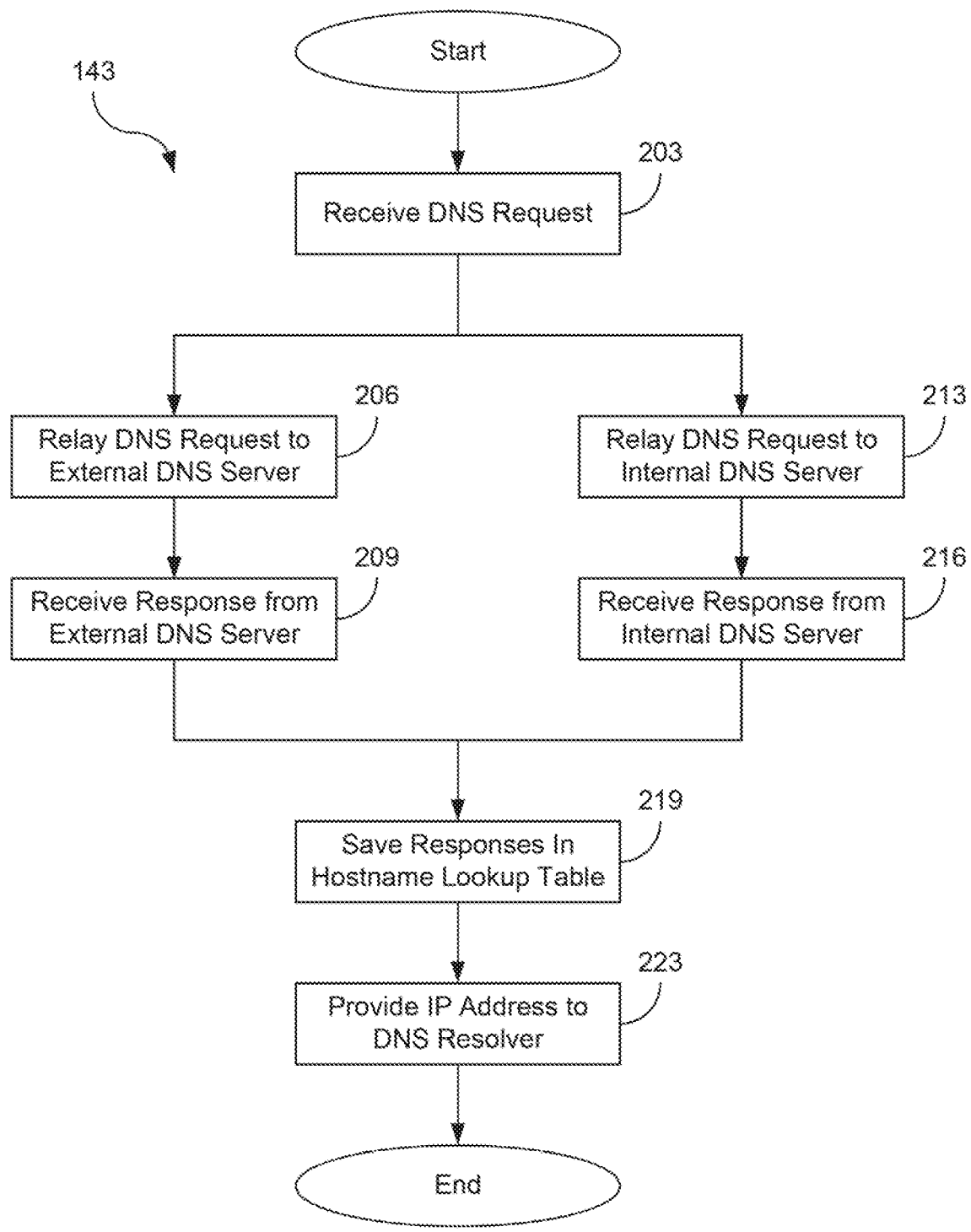
FIG. 2 is a flowchart illustrating one example of functionality implemented as portions of a local domain name service (DNS) server executed in the network environment of FIG. 1.

Referring next to FIG. 2, shown is a flowchart that provides one example of the operation of the local DNS server 143 to resolve DNS queries. As an alternative, the flowchart of FIG. 2 can be viewed as depicting an example of elements of a method implemented in the network environment 100.

Beginning at step 203, the local DNS server 143 receives a DNS query from the DNS resolver 136. The DNS query can include a hostname 163, such as a hostname 163 identifying an internal remote host 109 or an external remote host 116.

Next at step 206, the local DNS server 143 sends or relays the DNS query to an external DNS server 119. The request can be sent through a tunneled connection established by the tunnel client 133 and tunnel server 106 or through a bypassed connection that passes over the network 123 directly to the external DNS server 119. The external DNS server 119 may have been previously specified when the local DNS server 143 was originally configured or when the client device 103 first connected to the network 123. For instance, the external DNS server 119 may have been specified using the dynamic host configuration protocol (DHCP) when the client device 103 first connected to the network 123.

Then at step 209, the local DNS server 143 receives a response from the external DNS server 119. The response can include an external IP address 166 to which the hostname 163 maps. In instances where the external DNS server 119 implements various security protocols (e.g., DNSSEC), the local DNS server 143 can validate the response received from the external DNS server 119 as specified by the security protocol(s).

In parallel at steps 213 and 216, the local DNS server 143 similarly sends or relays the DNS query to an internal DNS server 113. The request can be sent through a tunneled connection established by the tunnel client 133 and tunnel server 109. The internal DNS server 113 may have been identified or previously specified to the client device 103 when the tunnel client 133 first established a tunneled connection with the tunnel server 106.

Subsequently at step 219, the local DNS server 143 saves the responses to the hostname lookup table 153. If the hostname 163 has not been previously resolved by the local DNS server 143, the local DNS server 143 can create a new entry in the hostname lookup table 153 to create a mapping between the hostname 163, external IP address 166 received from the external DNS server 119 at step 209, and the internal IP address 169 received from the internal DNS server 113 at step 216. If the hostname 163 has already been previously resolved by the local DNS server 143, then the local DNS server 143 can instead update an existing mapping to reflect any new information, such as a new external IP address 166 or internal IP address 169 associated with the hostname 163.

Finally at step 223, the local DNS server 143 provides an IP address to the DNS resolver 136. This can be either the internal IP address 169 or the external IP address 166, depending on the particular implementation deployed. For example, the local DNS server 143 could provide the internal IP address 169 by default, and the external IP address 166 if an internal IP address 169 was not returned at step 216. As another example, the local DNS server 143 could provide either the internal IP address 169 or the external IP address 166 based on a routing policy 149. In this example, the local DNS server 143 could search for a routing policy 149 applicable to the hostname 163 and then return the IP address type specified by the routing policy 149.

Figure 3:
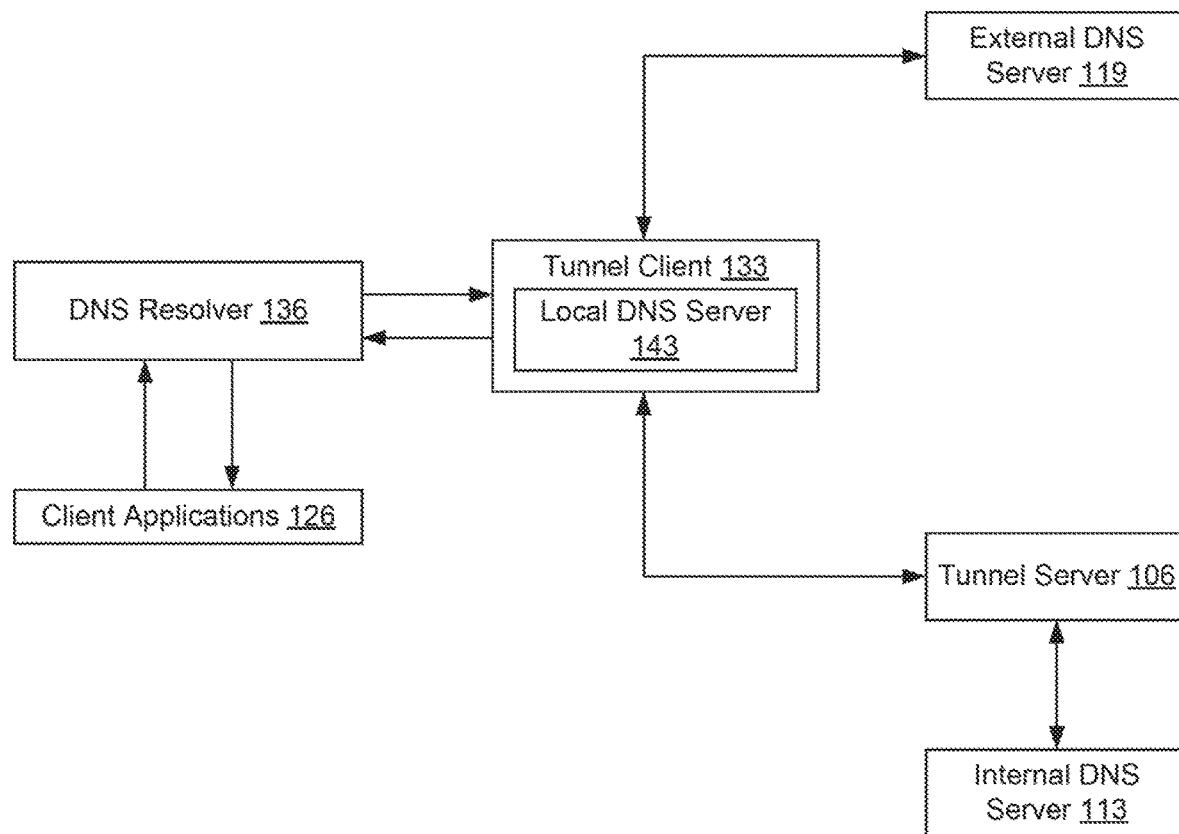
FIG. 3 is an architectural diagram illustrating the interaction of the local DNS server with other components of the network environment of FIG. 1.

FIG. 3 provides an architectural diagram illustrating the interactions between the local DNS server 143 provided by the tunnel client 133 and the various other components of the network environment 100. As illustrated, client applications 126 are in communication with the DNS resolver 136. If the DNS resolver 136 is unable to response with an appropriate IP address for the hostname 163 specified in the DNS query (e.g., from a cache or from the hostname lookup table 153), then the DNS query can be recursively resolved. To recursively resolve the DNS query, the DNS resolver 136 communicates the DNS query to the local DNS server 143. If the local DNS server 143 is unable to respond with an appropriate IP address (e.g., an internal IP address 169 or external IP address 166 previously cached in the hostname lookup table 153), then the local DNS server 143 can forward the DNS request containing the hostname 163 to the external DNS server 119 and the internal DNS server 113. The external DNS server 113 and internal DNS server 119 can both respond to the DNS query from the local DNS server 143, which stores the results and forwards one of the resolved IP addresses (e.g., the external IP address 166 or internal IP address 169) to the DNS resolver 136. The DNS resolver 126 can then forward the IP address to the requesting client application 126.

Figure 4A:
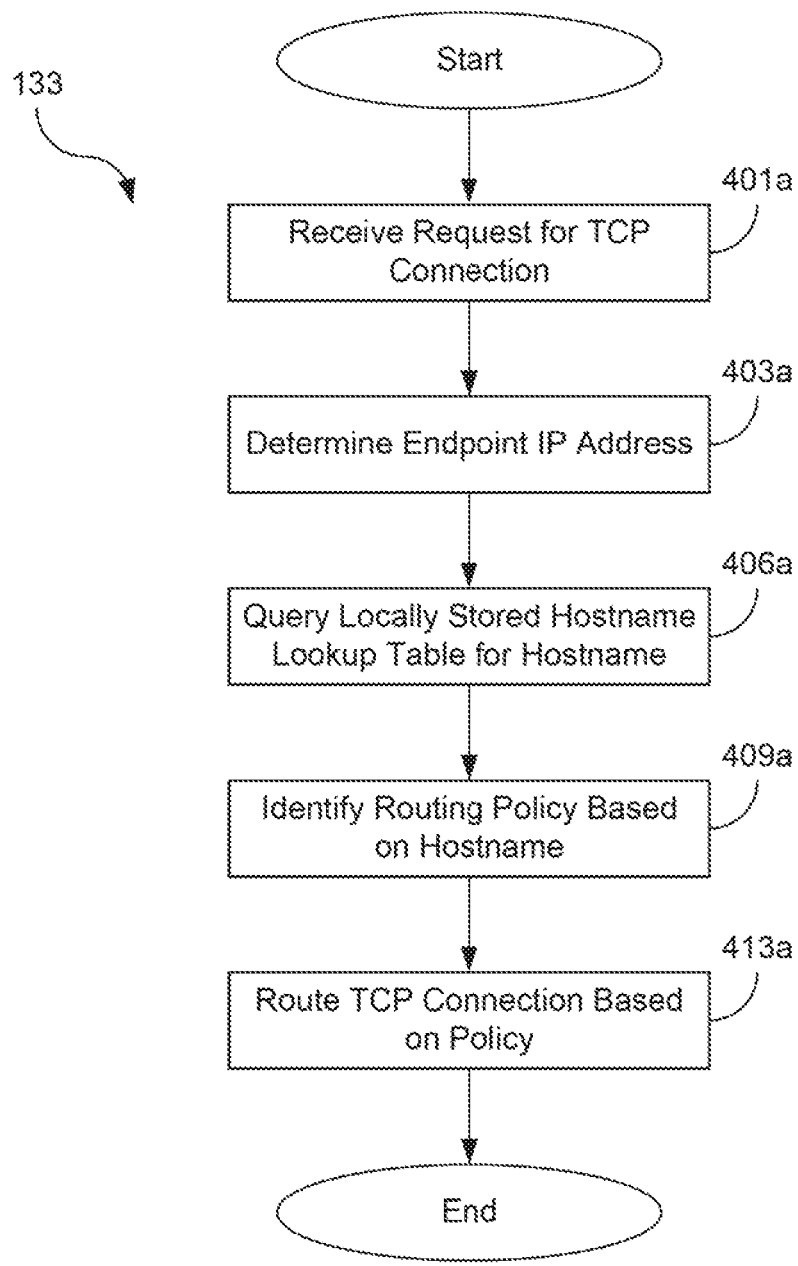
FIG. 4A is a flowchart illustrating one example of the functionality provided by the tunnel client as executed in the network environment of FIG. 1.

Referring next to FIG. 4A, shown is a flowchart that provides one example of the operation of the tunnel client 133 to route TCP connections on behalf of a client application 126 within the network environment 100 of FIG. 1. As an alternative, the flowchart of FIG. 4A can be viewed as depicting an example of elements of a method implemented in the network environment 100.

Beginning with step 401a, the tunnel client 133 receives a request from the network driver 129 to create a TCP connection. Because the connection is a TCP connection, it will include an IP address representing the endpoint of the TCP connection, but lack a hostname 163.

Proceeding to step 403a, the tunnel client 133 can parse the TCP connection request to determine the endpoint IP address. For reference, the endpoint IP address is the IP address (e.g., internal IP address 169 or external IP address 166) of a remote host (e.g., internal remote host 109 or external remote host 116) to which the network driver 129 is attempting to establish a connection.

Next at step 406a, the tunnel client 133 can query the hostname lookup table 153 to determine a hostname 163 that is mapped to the endpoint IP address of the TCP connection. For example, if the TCP connection request includes an internal IP address 169, the tunnel client 133 could search the hostname lookup table 153 for a hostname 163 mapped to the internal IP address 169 specified as the endpoint of the TCP connection. Similarly, if the TCP connection request includes an external IP address 166, the tunnel client 133 could search the hostname lookup table 153 for a hostname 163 mapped to the external IP address 166 specified as the endpoint of the TCP connection.

Then at step 409a, can identify a routing policy 149 based on the hostname 163 previously identified at step 406a. For example, the routing policy 149 can specify a particular type of action to be taken in response to a TCP connection specifying an endpoint IP address that maps to the hostname 163. Examples of such actions include blocking the connection, redirecting the connection to the relay service 139 in order to utilize a tunneled connection across the network 123, or directly connecting to the endpoint IP address using a bypassed connection across the network 123.

Subsequently at step 413a, the tunnel client 133 then routes or causes the TCP connection to be routed based on the routing policy 149 identified at step 409a. For example, if the routing policy 149 specifies that the connection is to be blocked, the tunnel client 133 could return a connection denied or connection closed status to the network driver 129. In some implementations, the tunnel client 133 could alternatively allow the TCP connection to time out. As another example, if the routing policy 149 specifies that the connection is to be routed across a tunneled connection, the tunnel client 133 could provide a TCP response to the network driver 129 redirecting the connection to the relay service 139. Once the network driver 129 connects to the relay service 139, the connection can be through the tunnel server 106 before reaching the final endpoint. In a similar example, if the routing policy 149 specifies that the connection is to be made directly with the endpoint IP address, the tunnel client 133 can return a response to the network driver 129 redirecting the TCP connection to the endpoint IP address directly. This allows for the network driver 129 to connect to a remote host (e.g., external remote host 116) using a bypassed connection.

In some instances, the routing of a TCP connection can require that the endpoint IP address be rewritten. For example, if the network driver 129 is attempting to initiate a TCP connection with an external remote host 116 and specifies an external IP address 166 as the endpoint IP address for the TCP connection, the network driver 129 will need the internal IP address 169 if the routing policy 149 specifies that the connection must be completed using a tunneled connection between the relay service 139 of the tunnel client 133 and the tunnel server 106. In such examples, the tunnel client 133 could provide the internal IP address 169 to the network driver 129, thereby allowing the network driver 129 to modify the TCP connection request in order to connect in a manner that complies with the routing policy 149. As a similar example, the tunnel client 133 could provide to the network driver 129 the external IP address 166 if the network driver 129 is attempting to access a remote host using a tunneled connection, but a routing policy 149 specifies that the connection should be made using a bypassed connection.

Figure 4B:
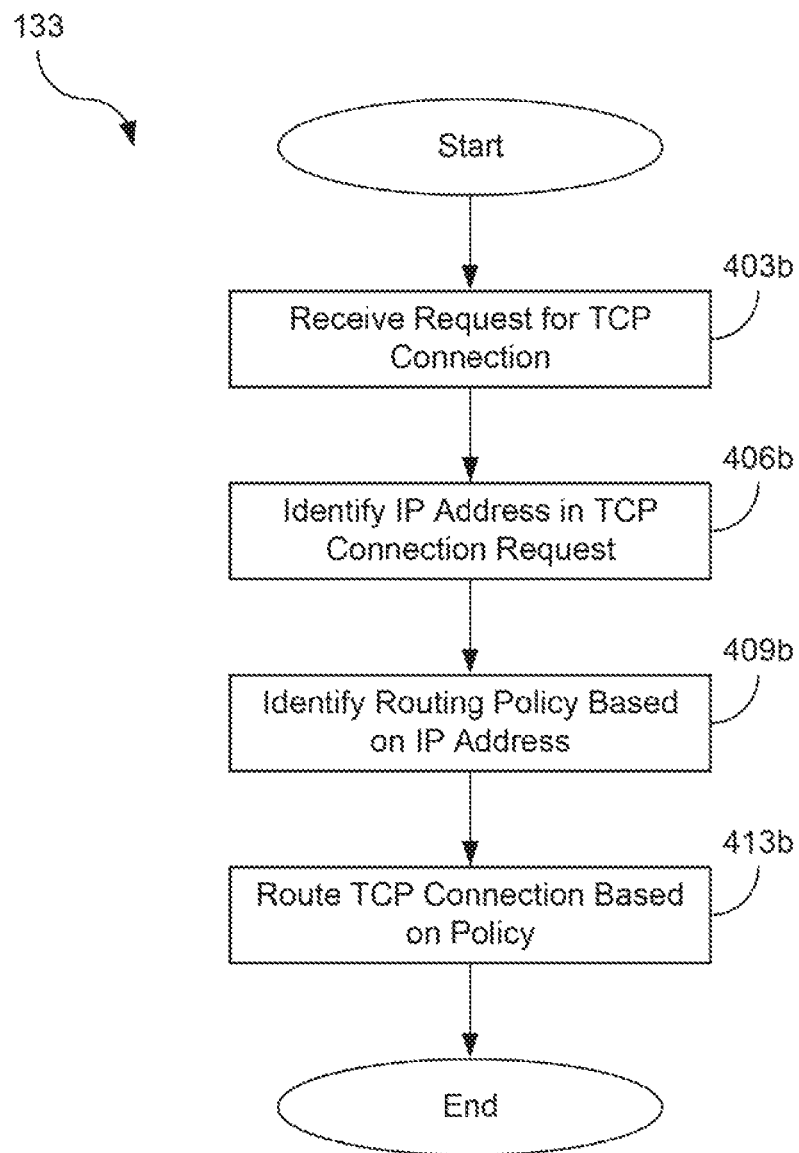
FIG. 4B is a flowchart illustrating an alternative example of the functionality provided by the tunnel client as executed in the network environment of FIG. 1.

Referring next to FIG. 4B, shown is a flowchart that provides an alternative example of the operation of the tunnel client 133 to route TCP connections on behalf of a client application 126 within the network environment 100 of FIG. 1. As an alternative, the flowchart of FIG. 4B can be viewed as depicting an example of elements of a method implemented in the network environment 100.

Beginning with step 403b, the tunnel client 133 receives a request from the network driver 129 to create a TCP connection. Because the connection is a TCP connection, it will include an IP address representing the destination of the TCP connection, but lack a hostname 163.

Next at step 406b, the tunnel client 133 can parse the TCP connection request to determine the endpoint IP address. For reference, the endpoint IP address is the IP address (e.g., internal IP address 169 or external IP address 166) of a remote host (e.g., internal remote host 109 or external remote host 116) to which the network driver 129 is attempting to establish a connection.

Unlike the method depicted in FIG. 4A, the tunnel client 133 can, at step 409b, identify an applicable routing policy 149 based on the endpoint IP address identified previously at step 406b. In certain implementations, the configuration of the hostname lookup table 153 and the setup of the routing policies 149 may allow for the tunnel client 133 to identify a routing policy 149 without identifying a hostname 163 associated with the endpoint IP address in the TCP connection request. For example, if there is a one-to-one mapping between internal IP addresses 169 and hostnames 163, then any routing policy 149 that is applicable to a particular internal IP address 169 is applicable to a specific hostname 163. Likewise, if there is a default routing policy 149 for endpoint IP addresses (e.g., all TCP connections with an external IP address 166 are to be routed across a bypassed connection), then identifying a routing policy 149 by IP address is equivalent to identifying a routing policy 149 by hostname 163.

Subsequently at step 413b, the tunnel client 133 then routes or causes the TCP connection to be routed based on the routing policy 149 identified at step 409b. For example, if the routing policy 149 specifies that the connection is to be blocked, the tunnel client 133 could return a connection denied or connection closed status to the network driver 129. In some implementations, the tunnel client 133 could alternatively allow the TCP connection to time out. As another example, if the routing policy 149 specifies that the connection is to be routed across a tunneled connection, the tunnel client 133 could provide a TCP response to the network driver 129 redirecting the connection to the relay service 139. Once the network driver 129 connects to the relay service 139, the connection can be through the tunnel server 106 before reaching the final endpoint. In a similar example, if the routing policy 149 specifies that the connection is to be made directly with the endpoint IP address, the tunnel client 133 can return a response to the network driver 129 redirecting the TCP connection to the endpoint IP address directly. This allows for the network driver 129 to connect to a remote host (e.g., external remote host 116) using a bypassed connection.

In some instances, the routing of a TCP connection can require that the endpoint IP address be rewritten. For example, if the network driver 129 is attempting to initiate a TCP connection with an external remote host 116 and specifies an external IP address 166 as the endpoint IP address for the TCP connection, the network driver 129 will need the internal IP address 169 if the routing policy 149 specifies that the connection must be completed using a tunneled connection between the relay service 139 of the tunnel client 133 and the tunnel server 106. In such examples, the tunnel client 133 could provide the internal IP address 169 to the network driver 129, thereby allowing the network driver 129 to modify the TCP connection request in order to connect in a manner that complies with the routing policy 149. As a similar example, the tunnel client 133 could provide to the network driver 129 the external IP address 166 if the network driver 129 is attempting to access a remote host using a tunneled connection, but a routing policy 149 specifies that the connection should be made using a bypassed connection.

Figure 5A:
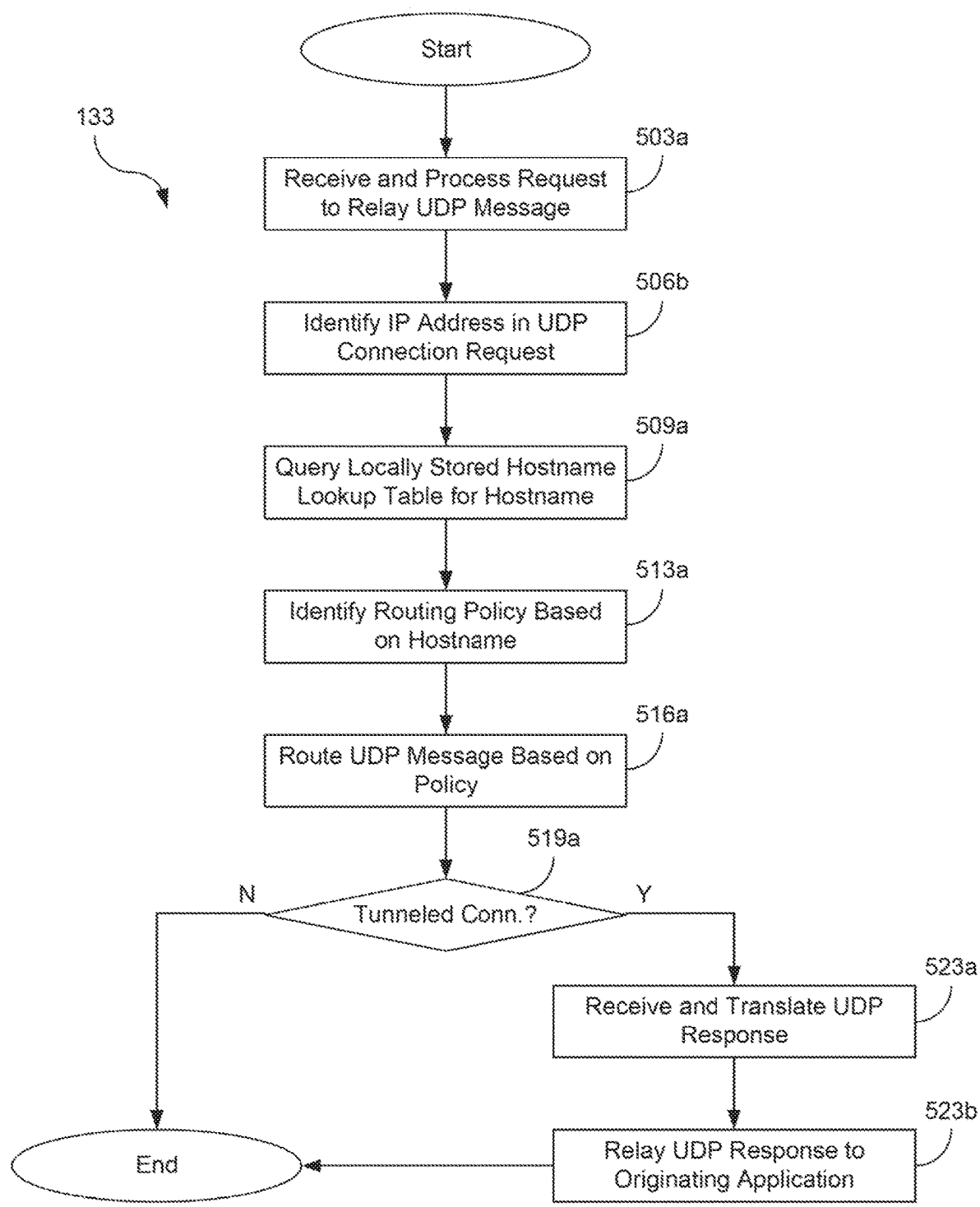
FIG. 5A is a flowchart illustrating one example of the functionality provided by the tunnel client as executed in the network environment of FIG. 1.

Referring next to FIG. 5A, shown is a flowchart that provides one example of the operation of the tunnel client 133 to route UDP connections on behalf of a client application 126 within the network environment 100 of FIG. 1. As an alternative, the flowchart of FIG. 5A can be viewed as depicting an example of elements of a method implemented in the network environment 100.

Beginning with step 503a, the tunnel client 133 can receive a request from the network driver 129 to relay a UDP datagram. Because the connection is a UDP connection, it will include a destination IP address 176 representing the destination or endpoint of the UDP datagram, but lack a hostname 163. Upon receipt, the tunnel client 133 can also process the request. For example, the tunnel client 133 can create an entry in the address translation table 156 for the UDP datagram. The entry can include the destination IP address 176 of the UDP datagram and the port that the UDP datagram is attempting to connect to. The port could be stored as a source port 173 for subsequent state tracking and address translation.

Proceeding to step 506a, the tunnel client 133 can parse the UDP relay request to determine the endpoint IP address for the UDP datagram. For reference, the endpoint IP address is the IP address (e.g., internal IP address 169 or external IP address 166) of a remote host (e.g., internal remote host 109 or external remote host 116) to which the network driver 129 is attempting to establish a UDP connection on behalf of a client application 126.

Then at step 509a, the tunnel client 133 can query the hostname lookup table 153 to determine a hostname 163 that is mapped to the endpoint IP address of the UDP connection. For example, if the UDP connection request includes an internal IP address 169, the tunnel client 133 could search the hostname lookup table 153 for a hostname 163 mapped to the internal IP address 169 specified as the endpoint of the UDP connection. Similarly, if the UDP connection request includes an external IP address 166, the tunnel client 133 could search the hostname lookup table 153 for a hostname 163 mapped to the external IP address 166 specified as the endpoint of the UDP connection.

Next at step 513a, can identify a routing policy 149 based on the hostname 163 previously identified at step 509a. For example, the routing policy 149 could specify a particular type of action to be taken in response to a UDP connection specifying an endpoint IP address that maps to the hostname 163. Examples of such actions include blocking the connection, redirecting the connection to the relay service 139 in order to utilize a tunneled connection across the network 123, or directly connecting to the endpoint IP address using a bypassed connection across the network 123.

Moving on to step 516a, the tunnel client 133 then routes or causes the UDP connection to be routed based on the routing policy 149 identified at step 513a. For example, if the routing policy 149 specifies that the connection is to be blocked, the tunnel client 133 could return a connection denied or connection closed status to the network driver 129. In some implementations, the tunnel client 133 could drop the UDP datagram, simulating a network timeout or error. As another example, if the routing policy 149 specifies that the connection is to be routed across a tunneled connection, the tunnel client 133 could provide a UDP response to the network driver 129 redirecting the connection to the relay service 139. Once the network driver 129 connects to the relay service 139, the connection can be through the tunnel server 106 before reaching the final endpoint. In a similar example, if the routing policy 149 specifies that the connection is to be made directly with the endpoint IP address, the tunnel client 133 can return a response to the network driver 129 redirecting the UDP connection to the endpoint IP address directly. This allows for the network driver 129 to connect to a remote host (e.g., external remote host 116) using a bypassed connection.

In some instances, the routing of a UDP connection can require that the endpoint IP address be rewritten. For example, if the network driver 129 is attempting to initiate a UDP connection with an external remote host 116 and specifies an external IP address 166 as the endpoint IP address for the UDP connection, the network driver 129 will need the internal IP address 169 if the routing policy 149 specifies that the connection must be completed using a tunneled connection between the relay service 139 of the tunnel client 133 and the tunnel server 106. In such examples, the tunnel client 133 could provide the internal IP address 169 to the network driver 129, thereby allowing the network driver 129 to modify the UDP connection request in order to connect in a manner that complies with the routing policy 149. As a similar example, the tunnel client 133 could provide to the network driver 129 the external IP address 166 if the network driver 129 is attempting to access a remote host using a tunneled connection, but a routing policy 149 specifies that the connection should be made using a bypassed connection.

Then at step 519a, the tunnel client 133 can determine whether or not the UDP datagram or connection was relayed or routed through a tunneled connection using the relay service 139. If the UDP connection was not routed through a tunneled connection, then the process ends. However, if the UDP connection was routed through a tunneled connection, then the process proceeds to step 523a.

Next at step 523a, the tunnel client 133 (e.g., the relay service 139) can receive a response to the UDP datagram that was previously routed or transmitted through the tunneled network connection. Because of the stateless or connectionless nature of UDP, client applications 126 often verify the source IP address 179 and port of UDP responses to confirm that the UDP response is a response to a previously sent request. However, a datagram being received from the tunnel server 106 can have a source IP address 179 that fails to match the destination IP address 176 of the original UDP request. Accordingly, the tunnel client 133 can rewrite the source IP address 179 of the UDP response to match the original destination IP address 176 of the original UDP request in order to allow the client application 126 to correctly verify the UDP response. This may be conceptually viewed as a "man-in-the-middle" being performed on the UDP connection.

Proceeding to step 526a, the tunnel client 133 can relay or provide the UDP response to the network driver 129, which can in turn forward the UDP response to the client application 126. The process can then subsequently end.

Figure 5B:
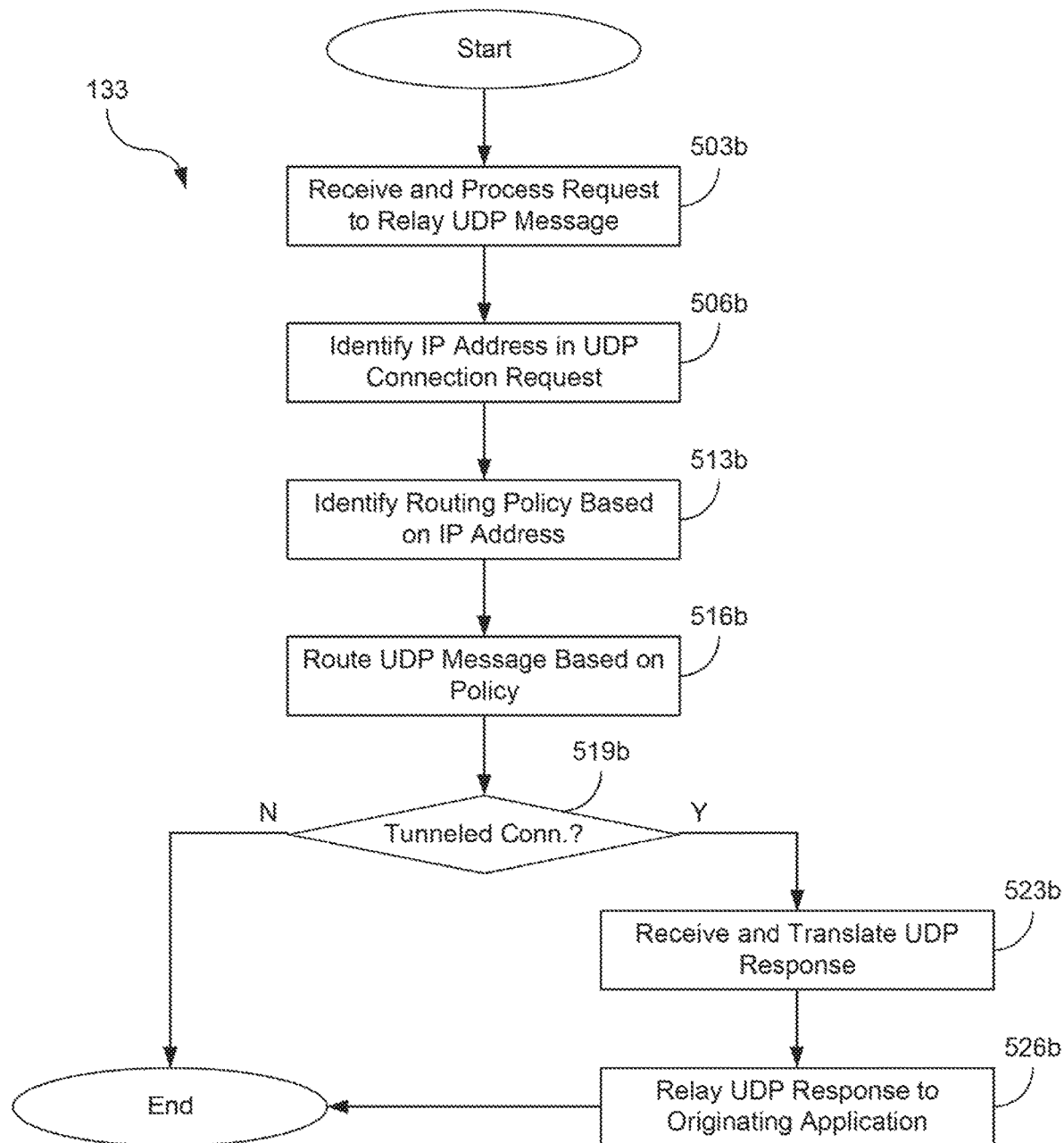
FIG. 5B is a flowchart illustrating an alternative example of the functionality provided by the tunnel client as executed in the network environment of FIG. 1.

Referring next to FIG. 5B, shown is a flowchart that provides one example of the operation of the tunnel client 133 to route UDP connections on behalf of a client application 126 within the network environment 100 of FIG. 1. As an alternative, the flowchart of FIG. 5B can be viewed as depicting an example of elements of a method implemented in the network environment 100.

Beginning with step 503b, the tunnel client 133 can receive a request from the network driver 129 to relay a UDP datagram. Because the connection is a UDP connection, it will include a destination IP address 176 representing the destination or endpoint of the UDP datagram, but lack a hostname 163. Upon receipt, the tunnel client 133 can also process the request. For example, the tunnel client 133 can create an entry in the address translation table 156 for the UDP datagram. The entry can include the destination IP address 176 of the UDP datagram and the port that the UDP datagram is attempting to connect to. The port can be stored as a source port 173 for subsequent state tracking and address translation.

Proceeding to step 506b, the tunnel client 133 can parse the UDP relay request to determine the endpoint IP address for the UDP datagram. For reference, the endpoint IP address is the IP address (e.g., internal IP address 169 or external IP address 166) of a remote host (e.g., internal remote host 109 or external remote host 116) to which the network driver 129 is attempting to establish a UDP connection on behalf of a client application 126.

Next at step 513b, can identify a routing policy 149 based on the hostname 163 previously identified at step 509b. For example, the routing policy 149 could specify a particular type of action to be taken in response to a UDP connection specifying an endpoint IP address that maps to the hostname 163. Examples of such actions include blocking the connection, redirecting the connection to the relay service 139 in order to utilize a tunneled connection across the network 123, or directly connecting to the endpoint IP address using a bypassed connection across the network 123.

Unlike the method depicted in FIG. 5A, the tunnel client 133 can, at step 513b, identify an applicable routing policy 149 based on the endpoint IP address identified previously at step 506b. In certain implementations, the configuration of the hostname lookup table 153 and the setup of the routing policies 149 may allow for the tunnel client 133 to identify a routing policy 149 without identifying a hostname 163 associated with the endpoint IP address in the UDP connection request. For example, if there is a one-to-one mapping between internal IP addresses 169 and hostnames 163, then any routing policy 149 that is applicable to a particular internal IP address 169 is applicable to a specific hostname 163. Likewise, if there is a default routing policy 149 for endpoint IP addresses (e.g., all UDP connections with an external IP address 166 are to be routed across a bypassed connection), then identifying a routing policy 149 by IP address is equivalent to identifying a routing policy 149 by hostname 163.

Moving on to step 516b, the tunnel client 133 then routes or causes the UDP connection to be routed based on the routing policy 149 identified at step 513a. For example, if the routing policy 149 specifies that the connection is to be blocked, the tunnel client 133 could return a connection denied or connection closed status to the network driver 129. In some implementations, the tunnel client 133 could drop the UDP datagram, simulating a network timeout or error. As another example, if the routing policy 149 specifies that the connection is to be routed across a tunneled connection, the tunnel client 133 could provide a UDP response to the network driver 129 redirecting the connection to the relay service 139. Once the network driver 129 connects to the relay service 139, the connection can be through the tunnel server 106 before reaching the final endpoint. In a similar example, if the routing policy 149 specifies that the connection is to be made directly with the endpoint IP address, the tunnel client 133 can return a response to the network driver 129 redirecting the UDP connection to the endpoint IP address directly. This allows for the network driver 129 to connect to a remote host (e.g., external remote host 116) using a bypassed connection.

In some instances, the routing of a UDP connection can require that the endpoint IP address be rewritten. For example, if the network driver 129 is attempting to initiate a UDP connection with an external remote host 116 and specifies an external IP address 166 as the endpoint IP address for the UDP connection, the network driver 129 will need the internal IP address 169 if the routing policy 149 specifies that the connection must be completed using a tunneled connection between the relay service 139 of the tunnel client 133 and the tunnel server 106. In such examples, the tunnel client 133 could provide the internal IP address 169 to the network driver 129, thereby allowing the network driver 129 to modify the UDP connection request in order to connect in a manner that complies with the routing policy 149. As a similar example, the tunnel client 133 could provide to the network driver 129 the external IP address 166 if the network driver 129 is attempting to access a remote host using a tunneled connection, but a routing policy 149 specifies that the connection should be made using a bypassed connection.

Then at step 519b, the tunnel client 133 can determine whether or not the UDP datagram or connection was relayed or routed through a tunneled connection using the relay service 139. If the UDP connection was not routed through a tunneled connection, then the process ends. However, if the UDP connection was routed through a tunneled connection, then the process proceeds to step 523b.

Next at step 523b, the tunnel client 133 (e.g., the relay service 139) can receive a response to the UDP datagram that was previously routed or transmitted through the tunneled network connection. Because of the stateless or connectionless nature of UDP, client applications 126 often verify the source IP address 179 and port of UDP responses to confirm that the UDP response is a response to a previously sent request. However, a datagram being received from the tunnel server 106 may have a source IP address 179 that fails to match the destination IP address 176 of the original UDP request. Accordingly, the tunnel client 133 can rewrite the source IP address 179 of the UDP response to match the original destination IP address 176 of the original UDP request in order to allow the client application 126 to correctly verify the UDP response. This may be conceptually viewed as a "man-in-the-middle" being performed on the UDP connection.

Proceeding to step 526b, the tunnel client 133 can relay or provide the UDP response to the network driver 129, which can in turn forward the UDP response to the client application 126. The process can then subsequently end.

Figure 6:
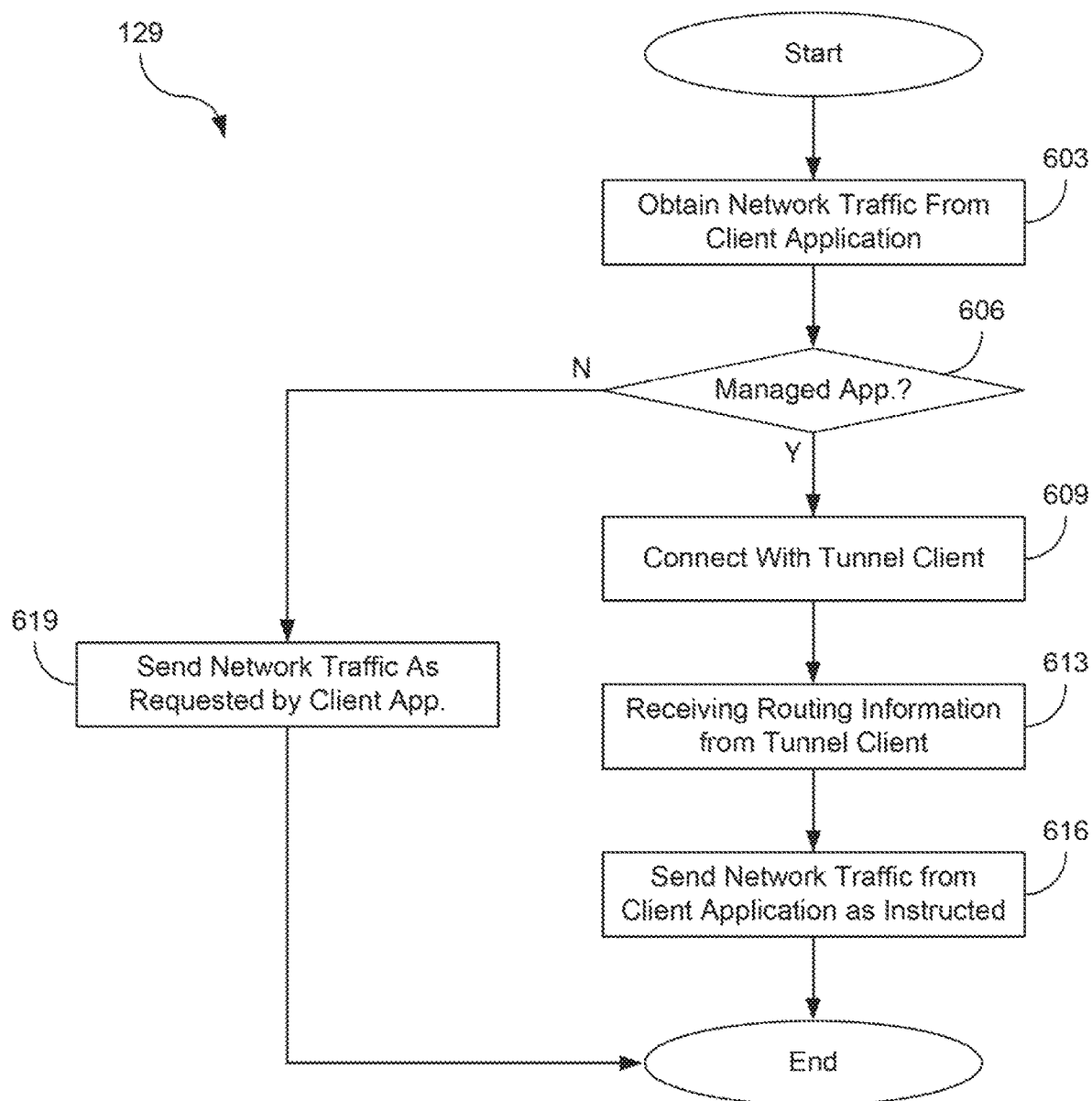
FIG. 6 is a flowchart illustrating one example of the functionality provided by the network driver as executed in the network environment of FIG. 1.

Referring next to FIG. 6, shown is a flowchart that provides one example of the operation of the network driver 129 to establish network connections on behalf of a client application 126 within the network environment 100 of FIG. 1. As an alternative, the flowchart of FIG. 6 can be viewed as depicting an example of elements of a method implemented in the network environment 100.

Beginning at step 603, the network driver 129 can obtain network traffic from a client application 126. This can be performed in a number of ways. For example, the client application 126 may be specifically configured use the network driver 129 instead of another driver or interface provided by the operating system of the client device 103. As another example, the network driver 129 can replace or impersonate a driver or interface provided by the operating system of the client device 103. In this example, all client applications 126 attempting to access the network 123 would utilize the network driver 129, allowing the network driver 129 to intercept or capture any traffic originating from any client application 126 installed on the client device 103.

Next at step 606, the network driver 129 can determine whether the client application 126 that originated the network traffic obtained at step 603 is a managed application. For example, the network driver 129 can determine an identifier for the client application 126 (e.g., a process name) and see if the identifier is present in the list of managed applications 159. However, in those embodiments where a client application 126 must be specifically configure to utilize the network driver 129, the network driver 129 may presume or otherwise assume that any client application 126 that uses the network driver 129 to access the network 123 is a managed application. If the network driver 129 determines that the client application 126 is a managed application, then the process continues to step 609. However, if the network driver 129 determines that the client application 126 is not a managed application, then the process instead continues to step 619.

If the process proceeds to step 609, the network driver 129 can make a connection with the tunnel client 133. As part of the connection process, the network driver 129 makes a connection request (e.g., a TCP connection request or forwards a copy of a UDP datagram).

Subsequently at step 613, the network driver 129 can receives a connection response from the tunnel client 133 that provides routing information. The routing information may be based on one or more routing policies 149 evaluated by the tunnel client. For example, the routing information may specify that the connection be closed, that the connection be forwarded through the relay service 139 provided by the tunnel client 133, or that the connection be made directly with the remote host.

Moving on to step 616, the network driver 129 forwards the network traffic from the client application as instructed by the tunnel client 133. If the connection is to be blocked, the network driver 129 can close the connection and report it as closed, terminated, or rejected to the client application 126. Likewise, if the connection is to be routed through a tunneled connection, the network driver 129 may connect with the relay service 139 and forward the traffic from the client application 126 through the tunneled connection. Similarly, if the connection is to be made directly with the remote host, the network driver 129 can create a bypassed connection across the network 123 to directly connect with the remote host. After establishing the connection or forwarding the network traffic, the process ends.

However, if the process instead proceeded from step 606 to step 619, then the network driver 129 can create a network connection in the manner requested by the client application 126. For example, if the network connection specifies an external IP address 166, the network driver 129 can create a bypassed connection with the external remote host 116. Similarly, if the network connection specifies an internal IP address 169, the network driver 129 can create a tunneled connection to the appropriate internal remote host 109 or external remote host 116.

Figure 7:
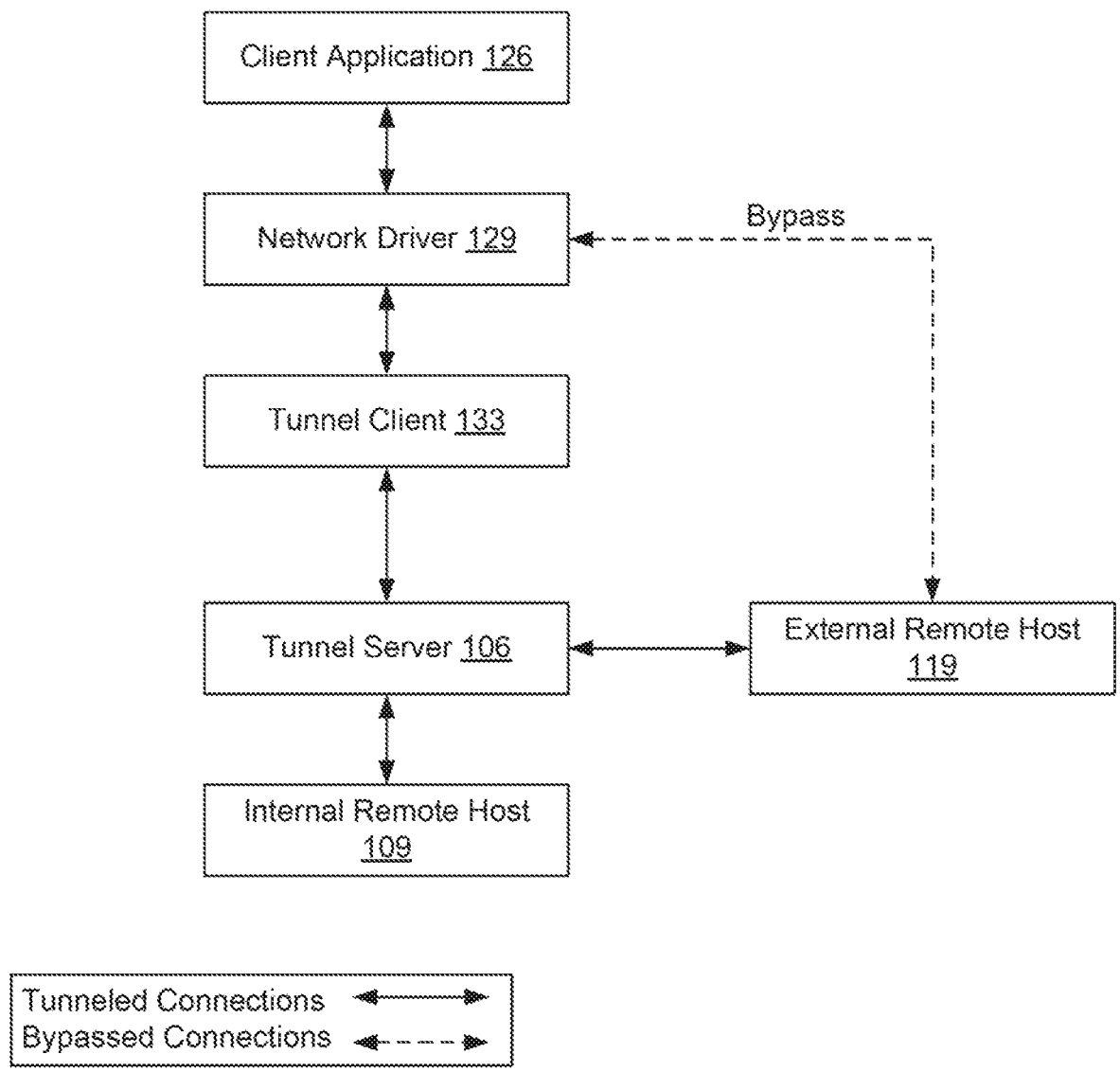
FIG. 7 is an architectural diagram illustrating the interaction of the tunnel client with various other components of the network environment of FIG. 1.

FIG. 7 provides an architectural diagram illustrating the interactions between the client application 126, the network driver 129, the tunnel client 133, the tunnel server 106, and an external remote host 119 or internal remote host 109 within the network environment 100. As illustrated, a client application 126 can call the network driver 129 to establish a network connection. The network driver 129 can then establish either a bypassed connection directly with a remote host (e.g., the external remote host 119) or a tunnel connection utilizing a network tunnel established between the tunnel client 133 and the tunnel server 106. Whether the network driver 129 establishes a bypassed connection or a tunneled connection is determined using the previously described processes of FIGS. 2-6. If the network driver 129 utilizes a tunneled connection, the network traffic can be sent to either an internal remote host 109 or an external remote host 119. Likewise, if the network driver 129 utilizes a bypassed connection, the network traffic can be sent to the external remote host 119 directly.

A number of software components are stored in the memory of a computing device and are executable by a processor. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory including random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory can include both volatile and nonvolatile memory and data storage components. Volatile components are those that do not retain data values upon loss of power. Nonvolatile components are those that retain data upon a loss of power. Thus, the memory can comprise random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise static random access memory (SRAM), dynamic random access memory (DRAM), or magnetic random access memory (MRAM) and other such devices. The ROM can comprise a programmable read-only memory (PROM), an erasable programmable read-only memory (EPROM), an electrically erasable programmable read-only memory (EEPROM), or other like memory device. Also, the processor can represent multiple processors and/or multiple processor cores and the memory can represent multiple memories that operate in parallel processing circuits, respectively.

The computer-readable medium can represent any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Although the applications or services described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

Although the flowcharts show a specific order of execution, it is understood that the order of execution can differ from that which is depicted. For example, the order of execution of two or more blocks can be scrambled relative to the order shown. Also, two or more blocks shown in succession in the flowcharts can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

What is claimed is:

1. A system for transparently proxying connections based on host names, comprising:
   a computing device comprising a processor and a memory;
   a network driver configured to provide network access to applications installed on the computing device, wherein the network driver is further configured to cause the computing device to at least:
      obtain a request to make a universal datagram protocol (UDP) connection from an application executing on the computing device, the request to a remote host specified by a destination internet protocol (IP) address in the request;
      determine an identifier for the application initiating the request;
      determine whether the identifier is present in a list of managed applications;
      in an instance in which the identifier is present in the list of managed applications, make a connection to:
   a tunnel client stored in the memory that, when executed by the processor, causes the processor to at least:
      receive from the network driver the request;
      query a hostname lookup table to determine a hostname associated with the IP address for the remote host;
      identify a policy based on the hostname associated with the destination IP address for the remote host, wherein the policy specifies that the UDP connection is to be routed through a tunneled connection maintained by the tunnel client;
      route the UDP connection through the tunneled connection based on the policy;
      identify a source IP address of a UDP response to the UDP connection;
      replace the source IP address of the UDP response with the destination IP address specified in the UDP connection; and
      provide the UDP response to the network driver.

2. The system of claim 1, wherein the tunnel client further causes the computing device to utilize the tunnel client as a domain name service (DNS) server for resolving DNS queries of applications executing on the computing device.

3. The system of claim 1, wherein the tunnel client, when executed to route the UDP connection based on the policy, further causes the processor to send a response to the request from the network driver, the response comprising a command to the network driver for how to establish the UDP connection with a remote host.

4. The system of claim 1,
   wherein the hostname lookup table is queried in an instance in which the application is specifically configured to utilize the network driver.

5. The system of claim 1, wherein the policy is a first policy and the tunnel client is further configured to cause the computing device to at least:
   identify a type of network traffic of the UDP connection;
   identify a second policy based on the type of network traffic, the second policy also specifying that the UDP connection is to be routed through a tunneled connection maintained by the tunnel client; and
   wherein the UDP connection is routed through the tunneled connection based on the first policy and the second policy.

6. The system of claim 1, wherein the tunnel client is further configured to cause the computing device to at least:
   receive a domain name service (DNS) query from an application initiating the request to make the UDP connection;
   resolve the DNS query; and
   provide a DNS response to the application initiating the request to make the UDP connection.

7. The system of claim 6, wherein resolution of the DNS query further comprises the tunnel client causing the computing device to at least:
   relay the DNS query to a first DNS server reachable through the tunneled connection; and
   relay the DNS query to a second DNS server reachable through an untunneled connection.

8. A method for transparently proxying connections based on host names, comprising:

obtaining, by a network driver, a request to make a universal datagram protocol (UDP) connection from an application, the request to a remote host specified by a destination internet protocol (IP) address in the request;

determining, by the network driver, an identifier for the application initiating the request;

determining, by the network driver, whether the identifier is present in a list of managed applications;

in an instance in which the identifier is present in the list of managed applications, making, by the network driver, a connection to a tunnel client configured to execute a method, comprising:

receiving the request;

querying a hostname lookup table to determine a hostname associated with the IP address for the remote host;

identifying a policy based on the hostname associated with the destination IP address for the remote host, wherein the policy specifies that the UDP connection is to be routed through a tunneled connection maintained by the tunnel client;

routing the UDP connection through the tunneled connection based on the policy;

identifying a source IP address of a UDP response to the UDP connection;

replacing the source IP address of the UDP response with the destination IP address specified in the UDP connection; and providing the UDP response to the network driver.

9. The method of claim 8, wherein querying the hostname lookup table occurs in an instance in which the application is specifically configured to utilize the network driver.

10. The method of claim 8, further comprising:

receiving a domain name service (DNS) query from an application initiating the request to make the UDP connection;

resolving the DNS query; and providing a DNS response to the application initiating the request to make the UDP connection.

11. The method of claim 10, wherein resolving the DNS query further comprises:

relaying the DNS query to a first DNS server reachable through the tunneled connection; and relaying the DNS query to a second DNS server reachable through an untunneled connection.

12. The method of claim 8, wherein routing the UDP connection based on the policy further comprises sending a response to the request from the network driver, the response comprising a command to the network driver for how to establish the UDP connection with a remote host.

13. The method of claim 8, wherein the policy is a first policy and the method further comprises identifying a type of network traffic of the UDP connection;

identifying a second policy based on the type of network traffic, the second policy also specifying that the UDP connection is to be routed through the tunneled connection; and wherein the UDP connection is routed through the tunneled connection based on the first policy and the second policy.

14. The method of claim 8, wherein the type of network traffic comprises network traffic encrypted according to a version of the secure sockets layer (SSL) protocol or transport layer security (TLS) protocol.

15. A non-transitory computer-readable medium comprising machine-readable instructions for transparently proxying connections based on host names that, when executed by a processor of a computing device, cause the computing device to at least:

obtain, by a network driver, a request to make a universal datagram protocol (UDP) connection from an application executing on the computing device, the request to a remote host specified by a destination internet protocol (IP) address in the request;

determine, by the network driver, an identifier for the application initiating the request;

determine, by the network driver, whether the identifier is present in a list of managed applications;

in an instance in which the identifier is present in the list of managed applications, make, by the network driver, a connection to:

a tunnel client that, when executed, cause the computing device to at least:

receive a request to make a universal datagram protocol (UDP) connection to a remote host specified by a destination internet protocol (IP) address in the request;

query a hostname lookup table to determine a hostname associated with the IP address for the remote host;

identify a policy based on the hostname associated with the destination IP address for the remote host, wherein the policy specifies that the UDP connection is to be routed through a tunneled connection;

route the UDP connection through the tunneled connection based on the policy;

identify a source IP address of a UDP response to the UDP connection;

replace the source IP address of the UDP response with the destination IP address specified in the UDP connection; and provide the UDP response to the network driver.

16. The non-transitory computer-readable medium of claim 15, wherein the hostname lookup table is queried in an instance in which the application is specifically configured to utilize the network driver.

17. The non-transitory computer-readable medium of claim 15, wherein the machine-readable instructions, when executed, further cause the computing device to at least:

receive a domain name service (DNS) query from an application initiating the request to make the UDP connection;

resolve the DNS query; and provide a DNS response to the application initiating the request to make the UDP connection.

18. The non-transitory computer-readable medium of claim 17, wherein the machine-readable instructions that cause the computing device to resolve the DNS query further cause the computing device to at least:

relay the DNS query to a first DNS server reachable through the tunneled connection; and relay the DNS query to a second DNS server reachable through an untunneled connection.

19. The non-transitory computer-readable medium of claim 15, wherein the policy is a first policy and machine-readable instructions, when executed, further cause the computing device to at least:

identify a type of network traffic of the UDP connection;
identify a second policy based on the type of network traffic, the second policy also specifying that the UDP connection is to be routed through the tunneled connection; and
wherein the UDP connection is routed through the tunneled connection based on the first policy and the second policy.

\* \* \* \* \*